US010011175B2

(12) United States Patent
Schadeck

(10) Patent No.: US 10,011,175 B2
(45) Date of Patent: Jul. 3, 2018

(54) METHOD FOR OPERATING A VEHICLE SYSTEM OF A MOTOR VEHICLE AND MOTOR VEHICLE

(71) Applicant: AUDI AG, Ingolstadt (DE)

(72) Inventor: Michael Schadeck, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 889 days.

(21) Appl. No.: 13/671,066

(22) Filed: Nov. 7, 2012

(65) Prior Publication Data

US 2013/0116856 A1 May 9, 2013

(30) Foreign Application Priority Data

Nov. 8, 2011 (DE) .................. 10 2011 117 850

(51) Int. Cl.
*B60K 28/06* (2006.01)
*B60W 50/08* (2012.01)
*B60W 40/08* (2012.01)
*B60W 50/00* (2006.01)

(52) U.S. Cl.
CPC ............ *B60K 28/06* (2013.01); *B60W 40/08* (2013.01); *B60W 50/087* (2013.01); *B60W 2040/0818* (2013.01); *B60W 2040/0827* (2013.01); *B60W 2040/0863* (2013.01); *B60W 2040/0872* (2013.01); *B60W 2050/0082* (2013.01); *B60W 2050/0095* (2013.01); *B60W 2420/42* (2013.01); *B60W 2520/10* (2013.01); *B60W 2540/106* (2013.01); *B60W 2540/12* (2013.01); *B60W 2540/18* (2013.01); *B60W 2540/20* (2013.01); *B60W 2540/22* (2013.01); *B60W 2540/28* (2013.01); *B60W 2550/146* (2013.01); *B60W 2550/302* (2013.01); *B60W 2550/308* (2013.01)

(58) Field of Classification Search
CPC ...... B60K 28/06; B60W 40/08; B60W 50/087
USPC ............................................. 701/1
See application file for complete search history.

(56) References Cited

U.S. PATENT DOCUMENTS

| | | | |
|---|---|---|---|
| 5,574,641 A | 11/1996 | Kawakami et al. | |
| 5,815,070 A | 9/1998 | Yoshikawa | |
| 6,438,472 B1 | 8/2002 | Tano et al. | |
| 7,551,093 B2 | 6/2009 | Maass | |
| 8,068,968 B2 | 11/2011 | Kondoh | |
| 2003/0181822 A1* | 9/2003 | Victor | 600/558 |

(Continued)

FOREIGN PATENT DOCUMENTS

| | | |
|---|---|---|
| CN | 101101702 | 1/2008 |
| CN | 101236695 | 8/2008 |

(Continued)

*Primary Examiner* — Michael Dean Lang
(74) *Attorney, Agent, or Firm* — Henry M. Feiereisen LLC

(57) ABSTRACT

A method for operating a vehicle system of a motor vehicle for determining at least one state variable which describes the state of the driver, in particular the attention and/or fatigue of the driver, wherein the state variable is determined by using a reference data set which describes a reference state, in particular a normal state of the driver, wherein the conditions of a condition group are verified during an entire drive of the motor vehicle, and wherein when all conditions are established a reference data set is recorded so long as all conditions are established and the reference data set is analyzed for calibrating and/or adjusting at least one operating parameter of the vehicle system.

22 Claims, 1 Drawing Sheet

(56) References Cited

U.S. PATENT DOCUMENTS

| | | |
|---|---|---|
| 2007/0124027 A1 | 5/2007 | Betzitza et al. |
| 2009/0126843 A1 | 1/2009 | Thiele |
| 2009/0153313 A1 | 6/2009 | Roelke et al. |
| 2011/0160964 A1* | 6/2011 | Obradovich .................... 701/41 |

FOREIGN PATENT DOCUMENTS

| | | |
|---|---|---|
| CN | 101673464 | 3/2010 |
| CN | 101944271 | 1/2011 |
| DE | 44 00 207 | 7/1994 |
| DE | 196 30 970 | 2/1997 |
| DE | 102 10 130 A1 | 9/2003 |
| DE | 103 43 683 | 4/2005 |
| DE | 10 2004 052 519 A1 | 5/2006 |
| DE | 2005 015 486 | 10/2006 |
| DE | 10 2005 052 029 A1 | 5/2007 |
| DE | 10 2007 002 220 A1 | 7/2007 |
| DE | 10 2006 043 676 A1 | 3/2008 |
| DE | 10 2008 007 555 | 8/2008 |
| DE | 10 2008 042 342 A1 | 4/2010 |
| DE | 10 2009 002 277 A1 | 10/2010 |
| EP | 1 914 106 | 4/2008 |
| EP | 2 381 431 | 10/2011 |
| JP | 2000-171267 | 6/2000 |
| WO | WO 2007/145566 | 12/2007 |

* cited by examiner

METHOD FOR OPERATING A VEHICLE SYSTEM OF A MOTOR VEHICLE AND MOTOR VEHICLE

CROSS-REFERENCES TO RELATED APPLICATIONS

This application claims the priority of German Patent Application, Serial No. 10 2011 117 850.1, filed Nov. 8, 2011, pursuant to 35 U.S.C. 119(a)-(d), the disclosure of which is incorporated herein by reference.

BACKGROUND OF THE INVENTION

The present invention relates to a Method for operating a vehicle system of a motor vehicle and motor vehicle The following discussion of related art is provided to assist the reader in understanding the advantages of the invention, and is not to be construed as an admission that this related art is prior art to this invention.

Vehicle systems, in particular driver assist systems which are configured for determining and using a state variable which describes the state of the driver have already been proposed. For example, when a high level of fatigue of the driver is detected, a suggestion to take a break can be issued and/or operating parameters of other vehicle systems can be adjusted to the reduced alertness of the driver. Similar suggestion and adjustment systems are also known with regard to the attention of the driver, wherein for example it is monitored whether the driver pays attention to the traffic or is engaged in secondary activities. Especially in cases in which for example semi autonomous driver assist systems, for example longitudinal guiding systems or transverse guiding systems are used, a system which monitors the attention and/or fatigue of the driver can be useful.

In order to determine the state variable, a broad spectrum of different data is recoded and/or interpreted. It was often proposed to use an interior camera which observes the head and the face of the driver. Here, a model of the head can for example be observed, so that the orientation of the head, the time periods in which the eyes are open and closed, the shut-speed of the eyelids and the like can be determined and analyzed with regard to a state variable. A further example for a sensor whose data can indicate the state of a driver are steering sensors via which the steering behavior of the driver can be monitored. Corresponding pedal sensors are also used. However, environmental data can also be analyzed for example to check how accurately the driver follows the lane, because this also provides indications about his fatigue and/or attention. As can be seen, many different types of sensor data and parameters can be observed to obtain an indication regarding the fatigue and/or attention of the driver.

In order to analyze such a recorded situation data set which describes the behavior of a driver in a defined driving situation, in particular in order to be able to interpret the situation data set in the first place, comparison of the state of the driver to a wake and/or attentive state of driver has to be possible. Only in this way can deviations from this "normal state" be detected and evaluated. For the reliable functioning of the classification and interpretation algorithms, the determination of the norm behavior of the driver is thus required which then corresponds to a reference data set which, as reference state, ideally reflects a normal state. In the state of the art such a reference data set is also referred to as "baseline". In order to determine the reference data set it is known to use a fixed calibration period at the beginning of every drive in which the actual function of the vehicle system, for example a warning and/or adaption function is not available. During the calibration period, all required and available data are recorded and combined into a reference data set, wherein however, it is not known whether data which describe a normal state are obtained and whether the data quality is sufficient. Thus, very long time periods are used as calibration period. During these long time periods, for example twenty minutes, the actual function of the vehicle system is not available.

A great amount of data is acquired by the described routine for determining the baseline i.e., the reference data set. Special occurrences during the calibration period are not taken into account. Further, disadvantageously, a fixed time window is predetermined for the calibration regardless of whether a sufficient amount of data may already have been acquired. The reliability of the recorded reference data also cannot be ensured. As a consequence, loss of performance of the downstream algorithms for interpreting the state of the driver may occur, because a relevant determination of the driver's state is delayed and/or is based on insufficient base data.

It would therefore be desirable and advantageous to provide an improved to provide a method for operating a vehicle system for quickly and reliably obtaining reference data of a reference data set and to enable to maintain an up to date reference data set.

SUMMARY OF THE INVENTION

According to one aspect of the present invention a method a method for operating a vehicle system of a motor vehicle for determining at least one state variable which describes a state of a driver, in particular an attention and/or fatigue of the driver, includes the steps of verifying during an entire drive of the motor vehicle, whether conditions of a condition group are established, recording a reference data set when all conditions of the condition group are established, for as long as all the conditions are established, wherein said reference data set describes a reference state of the driver, analyzing the reference data set for calibrating and/or adjusting at least one operating parameter of the vehicle system, and determining the state variable as a function of the reference data According to the invention, it is thus proposed to recognize driving situations which are suitable for recording a reference data set (baseline), for example by means of an upstream software module and based on defined criteria i.e., the conditions of the condition group. For these sections, reference data are recorded and stored, wherein in particular after ending the baseline section i.e., when at least one condition is no longer satisfied, the recorded reference data are used to adapt and/or calibrate the operating parameters of the vehicle system, for example to calibrate modules for recognizing the state of the driver and/or adapt/update the parametrizing of the software modules. The conditions of the condition group are monitored during the entire drive to enable a constant updating, actualization and improvement of the data basis of the reference data sets.

Advantageously, baseline sections, and with this, reference data are determined cleanly and rapidly. The estimation of the state of the driver provides more accurate and reliable values for the state variable and the false positive rate is decreased. In particular, the present invention enables also to obtain to a reliable data basis faster and in a defined manner for determining the baseline, since data are analyzed in a targeted manner and thus a high quality of the reference data set is ensured even in the case of few reference data. The function of the vehicle system can be switched on immediately and/or after a shorter calibration phase, which is explained in more detail below.

In a concrete embodiment of the present invention, the conditions can include at least one condition relating to ego data of the own motor vehicle and/or at least one condition which relates to sensor data of at least one sensor, in particular an internal camera and/or for at least one condition which relates to system data of at least one further vehicle system, in particular a longitudinally guiding or transverse guiding driver assist system. In the sense of a certain modularity, the conditions can also be divided into sub groups which for example are always used when the corresponding sensors/driver assist systems are present and an analysis is useful. useful. Thus with regard to the longitudinal or the transverse guiding driver assist systems which automatically or semi-automatically perform driving interventions the corresponding criteria may for example not be analyzed, every time the driver assist system is active. For example, the analysis of a time gap to the driver driving ahead is only useful when the time gap is not regulated by an ACC system anyway. In addition, it can be provided that when the sensors are not installed, corresponding data are not taken into account. At least the means or the sensors for determining the ego data are installed in a majority of motor vehicles.

Expediently, exceeding a minimal speed of the motor vehicle and/or falling below a threshold value for the value of the steering angle and/or a none-set turn signal and/or falling below a threshold value for the value of the acceleration and/or the none engagement of a brake actuating element by the driver and/or falling below a threshold value for the gas pedal gradient and/or the none actuating of at least one control element for a predetermined period of time and/or a curvature which is determined from ego data and which falls below a threshold value, can be used as condition which relates to ego data. The possible conditions mentioned here, which particularly advantageously are all considered, ultimately describe a certain driving situation in which a normal state of a driver is rather likely for example the driving at a certain speed and not steering excessively. Further, by means of the direction indicator it can be checked whether the driver is about to, or plans to turn; excessive accelerations or decelerations outside of the motor brake can be excluded because they require the driver to behave outside the normal situation. It can also be checked how vigorously pedals are operated for example by considering a gas pedal gradient. Control interventions, in particular also at control elements which do not serve the actual driving, for example those of an air conditioning and/or a multimedia device, can also indicate that the driver is currently distracted and the current state is not suitable as baseline. For example, a condition can be that no such control interventions have occurred during 15 seconds. Finally, the curviness which is determined from ego data, in particular from the steering angle, a time and the speed of the motor vehicle, can also be considered because particularly curvy roads demand particular skills of the driver and thus do not reflect a normal state. For example, the curviness can be considered over the last one to two kilometers.

Further, exceeding a threshold value by a quality value which describes the quality of the sensor data and/or falling below a threshold value for the value of the horizontal pivot angle of the head of the driver from a straight ahead looking position and/or falling below a threshold for the spread which relates to the horizontal pivot angle of the head of the driver out of the straight ahead looking position for a predetermined time interval and/or falling below a threshold value for the value of the vertical pivot angle of the head of the driver from a straight ahead looking position and/or falling below a threshold for the spread which relates to the vertical pivot angle of the head of the driver out of the straight ahead looking position for a predetermined time interval, can be used as condition which relates to sensor data of an internal camera. Often, an internal camera is used by vehicle systems which are intended to determine a state variable of the driver, so that the latter is used here as an example of possible conditions which relate to such a sensor. In particular the condition relating to the quality of the measuring data can of course be used as relating to any other sensor, whose data are to be added to the reference data set. With regard to the camera, it can now be concretely checked whether the head is excessively moved in a vertical plane, i.e. towards the left or the right, which angular range is often referred to as "heading". In addition to the absolute value of the deviation from a straight ahead direction the spread can also be considered for a predetermined time interval, for example two seconds. For example, it can be provided that the spread which relates to the left-right movement of the head is not to exceed 25° during two seconds. The same observation can however, also be carried out for the vertical movement of the head (pitch). For example, the value of the pitch angle is not to exceed 15°, wherein the spread over two seconds is also not to exceed 15°. Here, it is also advantageous when all named conditions are considered together.

A falling below a threshold value for the time until leaving the driving lane and/or a falling below a threshold value for the standard deviation from the center of the actual driving lane and/or—in case a vehicle is detected which drives ahead—the presence of a minimal time gap to the vehicle driving ahead and/or a speed relative to the vehicle driving ahead, which speed is within an interval of 0 can be used as condition which relates to system data of a further vehicle system. As mentioned, the system data of transverse guiding and/or longitudinally guiding driver assist systems are particularly useful, wherein when these systems are capable of carrying out driving interventions themselves, such system data cannot be taken into account in the conditions when the corresponding driver assist system, which is configured for carrying out driving interventions is currently active, because in this case no conclusion can be drawn as to whether the driver is in a normal state. However, it is customary that the corresponding system data are also determined when the vehicle systems, concretely the driver assist systems, are currently not active so that they can be transmitted to the vehicle system via the bus system of the motor vehicle, which vehicle system determines the state variable.

As already mentioned, it is useful when a sensor which is considered within the context of the conditions also provides sensor data for the reference data set and for determining the state variable. In this way, a kind of pre-evaluation of the sensor data can be set as a condition with regard to the state of the driver, wherein it is roughly estimated whether a normal state of the driver may exist. In addition, the quality of the sensor data can be monitored, so that measurement errors or the like do not excessively influence the reference data sets.

In a particularly advantageous embodiment of the present invention, the conditions and/or the belonging of conditions to the condition group can be dynamically adjusted in dependence on driving situation data that describe the driving situation. An example for such a dynamic adjustment of the criteria that can lead to a recording of a reference data set was already described with regard to longitudinally guiding and/or transverse guiding driver assist systems which are configured for carrying out driving interventions, in which driver assist systems, system data that process conditions which are influenced by driving interventions (i.e. not by the driver) are no longer taken into account every time when the driver assist systems are in operation. However, further influencing factors are conceivable in dependence on which such an advantageous dynamic adjustment of conditions or the condition group is useful.

Thus, it can be provided that when a sensor and/or a vehicle system and/or a device that is configured for determining ego data are not available, the conditions which relate to the unavailable data are removed from the condition group. The availability of data which are used as input data of the conditions can be constantly monitored which also reflects the already discussed modular principle. When a system fails, the corresponding conditions can also no longer be checked in a meaningful manner and can thus be removed from the condition group.

Further, adapted conditions can be used for a predetermined period of time prior to the drive to more easily satisfy the conditions. Such a configuration is in particular useful when reference data are to be obtained quickly at the beginning of the drive, in order to use functions of the vehicle system as soon as possible. Such a time period can thus be regarded as a type of calibration phase in which the conditions are first kept somewhat more relaxed in order to record reference data faster, wherein after expiration of this calibration phase inaccuracies which may occur due to the constant updating provided in the invention, disappear again over the course of time due to re-calibration. For example, threshold values may be set higher or lower within the predetermined time period after the start of the drive. Such a time period can for example last for two to five minutes. However, instead of using a predetermined time period after the start of the drive, it is also conceivable to make the duration of the time period after the start of the drive dependent on the amount of recorded data.

In a particularly advantageous embodiment of the present invention, the conditions can be adapted and/or taken into account in dependence on an actual driving environment, in particular a street category. A street category of the actually driven on street can for example be obtained from a navigation system. For example, when driving on an highway, conditions which relate to staying in lane can be kept tighter than in other driving environments. When driving in city traffic, the condition which relates to a vehicle in front or a time gap to a vehicle driving ahead, can be deactivated similar to conditions which relate to system data of an ACC and/or lane guidance system. It can be seen that a broad spectrum of possibilities is conceivable to dynamically adapt the criteria for different driving environments.

In a refinement of the method according to the invention, reference data sets can be stored in a memory device together with time information which indicates their recording time. The recorded reference data sets are thus provided with a time label and stored in a memory device. As soon as the reference data set is stored, i.e. one of the conditions of the condition group is no longer satisfied, a signal can for example be transmitted to correspondingly downstream located software modules and/or algorithms, in order to communicate the availability of new reference data sets. Triggered by such a trigger signal, each downstream software module and/or each downstream algorithm can automatically read the reference data set from the memory device and (re)calibrate or re-parametrize the own routines.

In the following, such downstream software modules and/or algorithms are together referred to as analysis modules.

Thus, when at least one analysis module for analyzing the reference data sets is provided, particularly preferably at least on criteria for selecting the reference data sets to be analyzed by an analysis module can be used, in particular a minimal recording time. Since not every data set can be meaningfully analyzed by every analysis module, criteria can be provided wherein in the expedient example a minimal recording time is mentioned. Thus, with regard to sensor data of an internal camera that are to be analyzed, it can be provided that only reference data sets are processed whose recording time is at least ten seconds. However, also with regard to other types of data, in particular data that are analyzed statistically, it is useful to take such minimal recording times into account.

Preferably, the criteria can be adapted in dependence on a driving situation parameter in particular a reduced minimal recording time within a predetermined period of time after the beginning of the drive. Criteria which relate to the analysis of the reference data sets by analysis modules can thus be dynamically adjustable, particularly advantageously in a calibration phase as described previously. To establish a calibration or a suitable setting of operating parameters faster, an analysis of reference data sets of a shorter recording time can also be allowed at the beginning of the drive. However, criteria can also be dynamically adjustable in other ways during the drive, for example with regard to the driving environment, the presence of vehicles in front and the like.

It is also advantageous when at least two memory devices are used. This embodiment of the method according to the invention is particularly useful when the analysis of the reference data sets by the analysis modules requires a defined period of time in which new reference data are already recorded, which consequently cannot be analyzed at the same time as the other reference data set, and can thus be stored in another memory device. In general, the reference data sets can be stored in the memory devices or the one memory device in then manner of a list.

As already discussed, it can be provided within the context of the present invention to provide a certain calibration phase in which it is in particular possible to obtain reference data as fast as possible, which can be used for calibration and/or setting of operating parameters. It is conceivable within the context of the method according to the invention that at the start of a drive, the vehicle system is operated with a preset calibration and/or preset operating parameters so that the functions of the vehicle system can also be immediately used without having to wait for the calibration process. In this case, settings which are as general as possible are established which are only adapted to the actual driver by the recording of the reference data sets which recording is triggered when the conditions of the condition group are satisfied. In a further improvement, the vehicle system can be operated at the beginning of a drive with a calibration derived from at least one reference data set which was recorded in a previous drive, in particular a previous drive of the same driver and/or with operating parameters derived from at least one reference data set which was recorded in a previous drive, in particular a previous driver of the same driver. In this case, reference data of the, or of a previous drive are adopted, wherein it is particularly preferred when an assignment according to drivers can occur. For this, it can for example be provided that a driver is identified prior to the drive and a calibration which corresponds to the driver and/or operating parameters which correspond to the driver, are set. The baseline often is relatively different for different drivers so that such a driver-specific reuse of reference data sets or the settings derived there from is very useful when an operation of the functions of the vehicle system is already to be realized at the beginning of a drive.

In a further embodiment of the method according to the invention, only reference data sets which were recorded within a time interval prior to the actual time point and/or a defined number of last recorded reference data sets are taken into account for the calibration and/or adjustment of at least one operating parameter of the vehicle system. In particular, always the last recorded reference data set can be observed for the (after)-calibration and/or for the setting or adjustment of at least one operating parameter, wherein a previously set value can be carried over in a weighted manner. It is also possible to take reference data sets together into account which were considered in the last time period, as the case may be, time-weighted. Different possibilities are conceivable in order to perform the actual updating.

Beside the method, the present invention also relates to a motor vehicle including a vehicle system for determining at least one state variable which describes the state of the driver, in particular his attention and/or his fatigue, and a control device which is configured for carrying out the method according to the invention. All embodiments with regard to the method according to the invention are analogously transferable to the motor vehicle according to the invention with which the already discussed advantages can thus also be achieved.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
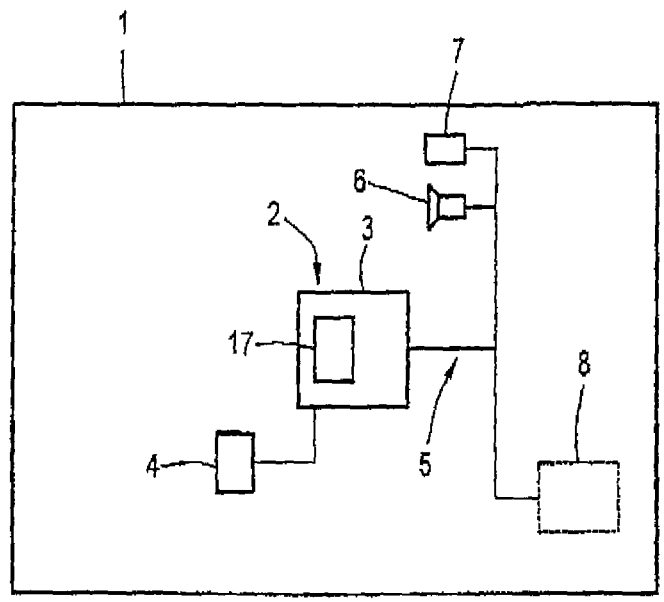
FIG. 1 shows a schematic diagram of a motor vehicle according to the invention and FIG. 2 shows a schematic diagram for carrying out the method according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a motor vehicle 1 according to the invention. The motor vehicle 1 includes a vehicle system 2 for determining state variables which describe the condition of a driver, wherein here in particular state variables are determined which describe the attention of the driver and the fatigue of the driver. For this, a control device 3 is provided in which the corresponding functions are realized by hardware and/or software modules. For example, the vehicle system 2 can be configured to output an alert on a corresponding display means 4, indicating a necessary break or the like when a state variable which describes the fatigue of the driver is determined which exceeds a threshold value.

The control device 3 is connected to a bus system 5 of the motor vehicle 1, here a CAN-Bus via which different vehicle systems of the motor vehicle 1 can exchange data. In the present case, the control device 3 receives and processes data which are received by an internal camera 6, a pedal- and steering sensor 7 and further vehicle systems 8 which are only outlined here. For the determination of the state variables, the processed data are analyzed with regard to the movement of the head of the driver, the eyes of the driver, the steering behavior of the driver, the braking and acceleration behavior of the driver, the accuracy with which the driver stays in the lane, the operation of control elements by the driver and the like, as it is generally known in the state of the art.

In order for a comparative basis, i.e. a normal condition of the driver to be present, a corresponding calibration and/or setting of operating parameters of the vehicle system 2 is required, for which in the present case reference data sets which describe a so called "baseline" are used. The reference data sets are recorded by means of the method according to the invention, with the control device 3 being configured for carrying out the method.

For this, in the method according to the invention, a plurality of conditions of a condition group are continuously checked, wherein the recording of a reference data set only occurs when all conditions are established. The conditions or their presence in the condition group are dynamically adjusted in dependence on driving situation data which describe the driving situation, which is explained in more detail below.

Figure 2:
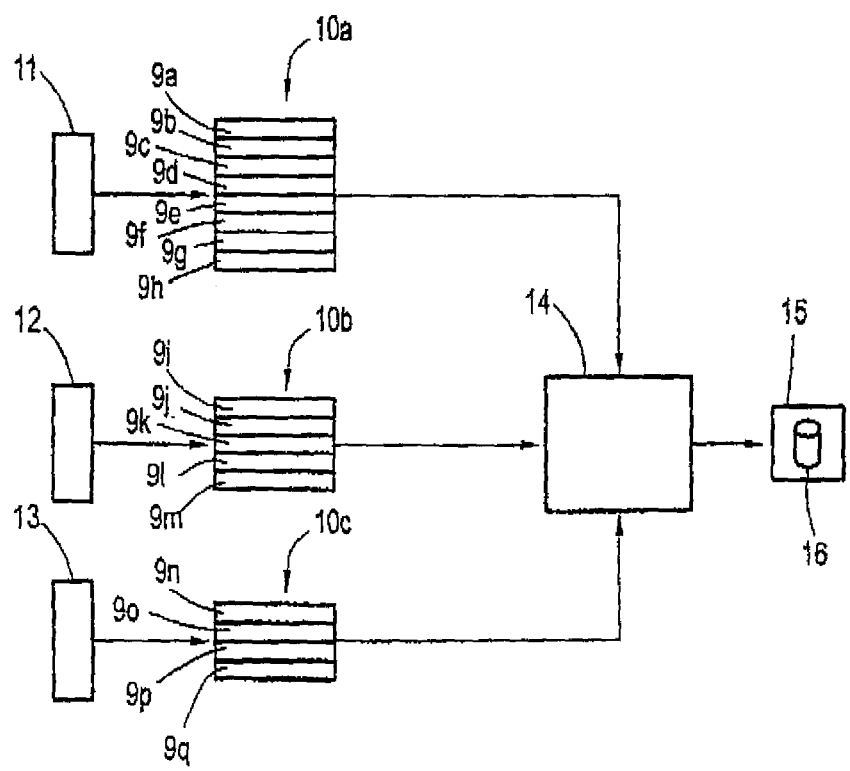

FIG. 2 shows a schematic diagram in which the conditions 9a-9q which are used in this exemplary embodiment, are divided into three subgroups 10a, 10b and 10c.

The subgroup 10a relates to conditions 9a-9h, which analyze ego data 11 of the motor vehicle 1, including for example the speed, the steering angle, the acceleration and the like. In this case, a pedal sensor is also already included in the ego data.

The group 10b includes conditions 9i-9m which analyze sensor data 12 of the internal camera 6. The sensor data 12 of the internal camera 6 are then, as the case may be, pre-analyzed, also stored in the reference data sets and also analyzed by the function of the vehicle system 2 as already indicated above. Such subgroups 10b can of course also be provided for other sensors that are relevant for the vehicle system 2.

The conditions 9n-9p with a precondition of the sub group 10c, which precondition is to be explained below, analyze system data 13 of further vehicle systems 8, in the present case in particular system data 13 of an ACC system as transverse guiding driver assist system and of a lane guidance system as longitudinally guiding driver assist system. Also in the case when both driver assist system are not in operation, they nevertheless record system data 13 relating to the lane behavior and the behavior regarding the distance to the vehicle driving ahead of the motor vehicle 1, which system data 13 are also provided to the control device 3 via the bus 5.

The boxes 14 of FIG. 2 symbolize a hard AND-operation, this means all conditions 9a-9q have to be satisfied in order for recording of reference data of a reference data set to occur in a step 15 until one of the conditions is no longer satisfied.

The condition 9a relates to exceeding a minimal speed by the actual speed of the motor vehicle 1. The minimal speed can for example be 40 km/h, wherein the latter can also be the subject of a dynamic adjustment, which will be explained in more detail below.

According to the condition 9b, the value of the steering angle has to fall below a maximally permitted threshold value for the steering angle, for example 10°. The condition 9c further demands that the direction indicator is not set.

The condition 9d relates to the acceleration. Here, the value of the acceleration must not exceed a maximal permitted acceleration, wherein at the same time according to the condition 9e, a braking of the driver, i.e. an actuation of the brake pedal is to be excluded. It is noted here that a negative acceleration in the sense of the condition 9d can also be brought about by a motor brake.

The condition 9f demands that the gas pedal gradient is smaller than a threshold value for the gas pedal value, so that excessively fast actuations of the gas pedal prevent the recording of reference data as well. The condition 9g relates to the actuation of certain control elements, in the instant case such control elements which do not concretely relate to operation of the motor vehicle 1, i.e. in particular of control elements of an air conditioning system and/or of a multimedia system. In the instant case, the latter must not have been actuated for a time period of 15 seconds in order to enable a recording of reference data.

In the condition 9h, a curviness is observed on the last 1.5 km of the driving course based purely on ego data of the motor vehicle 1, concretely the steering angle, a measured time and the speed. This curviness is also not to fall below a threshold value, in order for the condition 9h to be satisfied.

The condition 9i which like the conditions 9j, 9k and 9m analyzes sensor data 12 of the internal camera 7, relates to the quality of the camera data. A quality value which is determined from the quality of the sensor data 12 has to exceed a minimal value.

The conditions 9j and 9k relate to the horizontal movement of the head of the driver, i.e., the movement of the head in a horizontal plane (left-right movement) which is described by a horizontal pivot angle (heading angle). According to the condition 9j, the value of the pivot angle has to be smaller than a threshold value, for example 25°. According to the condition 9k, the spread is observed over a time period of two seconds. The spread has to be smaller than 25°.

Similar observations are carried out in the conditions 9l and 9m for the vertical pivot angle (pitch angle) of the head of the driver, wherein the value according to condition 9l is to be smaller than 15°, and the spread over two seconds according to the condition 9m smaller than 15°, again recorded over two seconds.

The conditions 9n-9q of the subgroup 10c relate to the analysis of the system data 13 of the ACC system and the lane guidance system, wherein the conditions 9n and 9o already represent a case of dynamic adjustment, because they include a precondition in order to be analyzed as part of the condition group in the first place. Thus, the condition 9n relates to a minimal time gap to a vehicle driving ahead, which for example can be between 2.3 and 3 seconds. The condition 9o relates to the presence of a relative speed to a vehicle driving ahead, which speed is generally to be 0, i.e., has to lie within a narrow interval around the value 0. Correspondingly, the precondition relates to the fact whether a vehicle driving ahead is present in the first place. When this is not the case the conditions 9n and 9o are not analyzed.

In condition 9p it is analyzed whether the time until leaving a lane (time to line crossing—TTLC) falls below a threshold value. In the condition 9q it is analyzed whether the standard deviation from the center of the actual lane (standard deviation lane position—SDLP) also falls below a threshold value.

Only when all conditions are established (wherein the conditions 9n and 9o are of course only checked when a vehicle in front is detected) the reference data set is recorded.

Regarding the conditions 9n and 9o it was already explained that depending on driving situations, a dynamic adjustment of conditions which are present in the condition group, here formed by the subgroups 10a, and 10b and 10c, can occur, because the conditions 9n and 9o only have to be established when there is a vehicle driving ahead. However, also in other aspects which have not yet been discussed, a dynamic adjustment of the condition group as well as the conditions 9a to 9q contained in the condition group occurs which is now explained in more detail.

First it is noted that in this exemplary embodiment of the present invention a time period after the start of a drive is predetermined in which time period the conditions 9a-9q are at least partially easier to satisfy, for example by a corresponding adjustment of the threshold values. The purpose of this predetermined time period, which can also be referred to as calibration phase is to obtain reference data as fast as possible.

It is further provided that when a sensor or a vehicle system or a device which is configured for determining ego data is not available, the conditions which relate to the unavailable data are removed from the condition group. For example, when it is determined that the internal camera 6 does not provide any sensor data 12, the conditions 9i-9m can be removed from the condition group. Thus, it is constantly monitored whether data failure occurs and the like.

Finally, an adjustment in dependence on a road category occurs in this exemplary embodiment of the method according to the invention also occurs, which road category can for example be provided by a navigation system. For example, conditions 9p and 9q are set narrower on a highway, while in city traffic the conditions 9n and 9o are removed from the condition group.

Of course, other possibilities are also conceivable to adjust the conditions or the condition group which can be realized in further exemplary embodiments.

As already explained, reference data are recorded until a condition 9a-9q is no longer satisfied. The reference data set 16 is stored in a memory device 17 (compare FIG. 1), wherein exemplary embodiments are also conceivable in which multiple memory devices 17 are provided, in particular when longer analyses by analysis modules which analyze the reference data set are required, which analyses last until the further recording of reference data. In the present case, the individual reference data sets 16 are stored in the memory device 17 in the manner of a list, wherein for example a ring memory can be used. The time point and the duration of the recording are stored together with the reference data sets, wherein the duration of the recording often lies within the range of two seconds and three minutes.

As soon as a new reference data set 16 is stored in the memory device 17 a corresponding trigger signal is transmitted to the analysis modules, which then first check whether the reference data set is to be analyzed by them, wherein a criteria for whether to analyze the reference data set for at least a portion of the analysis modules is in this case a minimal recording time. In particular, in the case when statistical analyses occur, partially defined recording times are useful in order to obtain sufficiently accurate operating parameters and the like. When a calibration phase, i.e. a predetermined time period after the start of the drive is provided, the criteria can also be adjusted for example by providing lower minimal recording times for the time period, thereby facilitating the fast acquisition of data.

Realizations are also conceivable, in which the functions of the vehicle system 2, for example the described warning function, are available immediately after the start of the drive, when, in a less preferred manner, a preset calibration, thus preset operating parameters are used or, in a manner which is preferred according to the invention, a calibration or operating parameters which are based on at least one reference data set which was recorded in a previous drive, wherein the same driver was active in the previous drive. For this, the driver is identified before the drive, for example via the data of the internal camera 6 or via another identification means. Then, a calibration which corresponds to the driver and/or operating parameters which correspond to the driver are set. In particular, the settings are adopted as they existed at the end of the last drive of the driver. During the calibration to the actual baseline, the functions of the vehicle system 2 can now nevertheless already be used, because settings already exist.

In the instant case, the analysis occurs in the analysis modules in such a manner that always the last reference data set 16 which corresponds to the criteria is analyzed, wherein the previous setting however, is still taken into account by way of a weighting. Other embodiments are also conceivable in which for example always a defined number of the most current reference data sets 16 is analyzed or a defined time interval is observed before the actual time point.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A Method for operating a vehicle system of a motor vehicle for determining at least one state variable which describes a state of a driver, in particular an attention and/or fatigue of the driver, comprising the steps of:
   verifying during an entire drive of the motor vehicle, whether conditions of a condition group are established;
   recording with sensors a reference data set when all conditions of the condition group are established, for as long as all said conditions are established, wherein said reference data set describes a reference state of the driver;
   storing the reference data set in a memory device;
   calibrating and/or adjusting at least one operating parameter of the vehicle system as a function of the reference data set; and
   determining the at least one state variable with the vehicle system having the calibrated and/or adjusted at least one operating parameter.

2. The method of claim 1, wherein the conditions include at least one member selected from the group consisting of a condition relating to ego data of the motor vehicle, a condition relating to sensor data of at least one sensor, and a condition relating to system data of at least one further vehicle system.

3. The method of claim 2, wherein the at least one sensor is constructed as an internal camera.

4. The method of claim 3, wherein the condition relating to sensor data of the internal camera includes at least one member selected from the group consisting of exceeding a threshold value by a quality value which describes a quality of the sensor data, falling below a threshold value for a horizontal pivot angle of the head of the driver from a straight ahead viewing position, falling below a threshold value for a spread which relates to the horizontal pivot angle of the head of the driver from the straight ahead viewing position for a predetermined time interval, falling below a threshold value for a value of a vertical pivot angle of the head of the driver from the straight ahead viewing position, and falling below a threshold value for another spread which relates to the vertical pivot angle of the head of the driver from the straight ahead viewing position for a predetermined time interval.

5. The method of claim 4, further comprising removing one of the conditions from the condition group when the one of the conditions relates to unavailable data.

6. The method of claim 4, further comprising before the verifying step adapting the conditions so as to facilitate establishment of the conditions, and using the adapted conditions after beginning the drive for a predetermined period of time.

7. The method of claim 6, wherein the reference data set to be analyzed in said analyzing step is selected as a function of at least one criteria and wherein said reference data sets are analyzed by using at least one analysis module.

8. The method of claim 7, wherein the criteria is a minimal recording time.

9. The method of claim 8, further comprising adapting the criteria in as a function of a driving situation parameter.

10. The method of claim 9, wherein the criteria is adapted to reduce the minimal recording time during a predetermined time period after beginning the drive.

11. The method of claim 4, further comprising adapting the conditions and/or taking the conditions of the condition group into account as a function of an actual driving environment.

12. The method of claim 11, wherein the actual driving environment is defined by a road category.

13. The method of claim 2, wherein the at least one further vehicle system includes a longitudinally guiding or transverse guiding driver assist system.

14. The method of claim 2, wherein the condition relating to ego data includes at least one member selected from the group consisting of falling below a threshold value for the value of a steering angle, failure by the driver to set a direction indicator, falling below a threshold value for a value of an acceleration, failure by the driver to actuate a brake-actuating element, falling below a threshold value for a gas pedal gradient, failure by the driver to actuate at least one control element for a predetermined period of time, and a curviness which is determined from the ego data and falls below a threshold value.

15. The method of claim 2, wherein the condition relating to system data of a further vehicle system includes at least one member selected from the group consisting of falling below a threshold value for a time until leaving a lane, falling below a threshold value for a standard deviation from a center of an actual lane, a presence of a minimal time gap to a vehicle driving ahead, and a speed relative to the vehicle driving ahead, said speed being within an interval of 0.

16. The method of claim 1, wherein the conditions and/or a belonging of the conditions to the condition group is dynamically adjusted in dependence on driving situation data which describe a driving situation.

17. The method of claim 1, further comprising storing the reference data sets in a memory device together with information indicating a time of recordation of the reference data sets.

18. The method of claim 1, wherein at a start of the drive, the vehicle system is operated with at least one member selected from the group consisting of a preset calibration, a calibration derived from at least one reference data set which was recorded in a previous drive, preset operating parameters, and operating parameters derived from at least one reference data set recorded in a previous drive.

19. The method of claim 18, wherein the previous drive is a previous drive of the same driver.

20. The method of claim 18, wherein the driver is identified prior to the drive and a calibration and/or operating parameters which correspond to the driver are set.

21. The motor vehicle of claim 20, wherein the state variable is an attention and/or a fatigue of the driver.

22. A motor vehicle, comprising:
   a vehicle system for determining a state variable which describes a state of a driver of the motor vehicle; and
   a control device for implementing the method of claim 1.

* * * * *